United States Patent Office 2,986,541
Patented May 30, 1961

2,986,541
COMPOSITIONS COMPRISING NON-GELATINIZED REACTION PRODUCTS OF METHYLOL-AMINO-TRIAZINE ALLYL ETHERS WITH α:β-UNSATURATED COMPOUNDS

Paul Zuppinger, Arlesheim, and Gustav Widmer, Basel, Switzerland, assignors to Ciba Limited, Basel, Switzerland No Drawing. Filed July 12, 1957, Ser. No. 671,425
Claims priority, application Switzerland July 16, 1956
10 Claims. (Cl. 260—21)

It is known to prepare esterified methylol-melamine alkyl ethers, and, inter alia, a product esterified with acrylic acid has been prepared by reacting hexamethylol-melamine hexamethyl ether with acrylic acid. This product, when admixed with a metal drier and/or peroxide, exhibits no oxidative drying properties at room temperature or at higher temperatures, and accordingly coatings produced therewith do not dry at such temperatures, but remain in the form of sticky coatings that are soluble in organic solvents.

It is known to etherify methylol-aminotriazines with allyl alcohol by reacting a methylol-aminotriazine, for example, hexamethylol-melamine, with allyl alcohol in the presence of an acid. The resulting methylol-melamine allyl ethers are capable of undergoing oxidative drying at room temperature in the presence of a metal drier, for example, cobalt naphthenate. The oxidative drying properties can be improved by the addition of a peroxide. However, there are obtained in this manner compositions which harden both at room temperature and at a raised temperature only at the surface, and not within the interior of the mass. The interior of the mass, depending on its thickness, consists of a more or less unchanged thickly liquid to viscous substance.

For many purposes, for example, for the production of lacquer films, thick coatings, castings, laminates, molding compositions, spreadable compositions and other products, it is desirable that they should harden not only at the surface but also in the interior of the mass.

The present invention is based on the observation that by reacting methylol-aminotriazine allyl ethers with α:β-unsaturated compounds of the kind described below, there are obtained products which in the presence of metal driers and peroxides yield at a raised temperature and also at room temperature masses that are hard both at the surface and in the interior.

The present invention provides a composition capable of hardening at the surface and in the interior at room temperature, which comprises a metal drier, a peroxide and a non-gelatinized reaction product of a methylol-aminotriazine allyl ether containing at least two amino groups and at least two allyl groups with an α:β-unsaturated compound which contains at least two free groups capable of reacting with the methylol-aminotriazine allyl ether.

As methylol-aminotriazine allyl ethers containing at least two amino groups and at least two allyl groups there may be used, for example, allyl ethers of methylol-melamines containing 2–6, and advantageously 4–6, allyl groups or allyl ethers of methylol-benzoguanamines containing 2–4, and advantageously three or four, allyl groups.

As α:β-unsaturated compounds which contain at least two groups capable of reacting with the methylol-aminotriazine allyl ethers, such as free carboxyl, hydroxyl, acid amide or amino groups, there may be used, for example, α:β-unsaturated dicarboxylic acids, such as maleic acid, fumaric acid, mesaconic acid or citraconic acid, and their anhydrides or amides; esters containing at least two free hydroxyl groups of α:β-unsaturated monocarboxylic acids with polyhydric alcohols, such as glycerine mono-acrylic acid ester or pentaerythritol diacrylic acid ester; reaction products containing amino and/or carboxyl groups obtained from α:β-unsaturated dicarboxylic acids and diamines, such as ethylene diamine, propylene diamine, butylene diamine or hexamethylene diamine; and especially the easily obtainable esters containing at least two carboxyl and/or hydroxyl groups, or mixtures of such esters, obtained from α:β-unsaturated dicarboxylic acids and polyhydric alcohols, such as glycol, propylene glycol, butylene glycol, glycerine or pentaerythritol.

The reaction of the methylol-aminotriazine allyl ethers with the α:β-unsaturated compounds is carried out in a simple manner by heating a mixture of the reaction components, advantageously in the presence of a polymerization stabilizer such as hydroquinone, to an extent just sufficient to avoid gelatinization taking place, the volatile constituents, such as water and allyl alcohol being removed, if desired, under reduced pressure.

The proportions of the reaction components used depends mainly on the gelatinization point, which varies depending on the nature of the α:β-unsaturated compound and on the proportion of the latter compound relatively to the allyl ether and is critical. The limits of the proportions to be used can be determined by simple tests. If, for example, for the reaction which is to be continued until the gelatinization point is nearly reached there are used 100 parts by weight of a methylol-melamine allyl ether containing about 4.8 allyl ether groups per mol of melamine and more than about 2–3 parts by weight of maleic acid or maleic anhydride, or more than about 12–15 parts by weight of an ester mixture having an acid number of 325 obtained by reacting equimolecular quantities of maleic anhydride and glycol, or more than about 30–40 parts by weight of a polyester mixture having an acid number of 126 obtained from equimolecular proportions of the aforesaid components, there are obtained gelatinized products which are unsuitable for the compositions of this invention. Below the limits so determined useful reaction products are obtained. Among these useful reaction products, which still contain allyl ether groups, those usually harden in the interior more rapidly which contain a relatively large amount of α:β-unsaturated compound condensed therein as distinct from those containing a small amount of α:β-unsaturated compound condensed therein.

In addition to metal driers, peroxides and the aforesaid reaction products of methylol-aminotriazine allyl ethers with α:β-unsaturated compounds, the compositions of this invention advantageously also contain polymerizable compounds. Suitable polymerizable compounds are those which contain the group $CH_2=C<$, for example, vinyl compounds such as styrene, divinyl-benzene and substitution products thereof, vinyl esters, vinyl ethers, vinyl halides, acrylic acid or methacrylic acid or esters thereof, acrylic acid amide, and also allyl compounds, such as diallyl phthalate or triallyl cyanurate. There may also be used polymerizable diesters of unsaturated dicarboxylic acids, especially esters or mixtures of esters of α:β-unsaturated dicarboxylic acids, such as maleic acid or fumaric acid, with polyhydric alcohols, such as glycol, propylene glycol, butylene glycol or glycerine, and also mixtures of such polymerizable compounds.

The compositions of this invention can be used as coating, casting, spreadable or molding compositions that harden at a raised temperature or at room temperature, or they can be used for the production of such compositions. The products obtainable with these compositions, such as coatings, films, castings or molded articles, are hardened throughout and are dry at the surface. Compositions which also contain polymerizable compounds of the aforesaid kind, for example, polyester-styrene mixtures, generally yield products having an improved resistance to chemicals.

The compositions of this invention, including those which contain a polymerizable compound, can be used with advantage for the manufacture of glass fiber laminates produced with polymerizable compounds, for example, polyester-styrene mixtures. If, for example, a composition of this invention is applied to that surface of such a glass fiber laminate which is exposed to air, there is obtained a coating which can easily be ground or polished and is highly resistant to solvents, hard and generally has a high gloss. The compositions of this invention which contain a polymerizable compound, especially a polyester-styrene mixture, can be used as such, instead of, for example, a polyester-styrene mixture, for the direct manufacture of glass fiber laminates, whereby excellent outer surfaces are likewise obtained.

Among the usual metal driers there are especially suitable driers of metals of the iron group, advantageously cobalt driers, for example, in the form of naphthenates or octoates. Generally the drier is used in a proportion not exceeding 0.2% calculated as metal. Suitable peroxides are, for example, benzoyl peroxides, methyl ethyl ketone peroxide, hydroxycyclohexyl hydroperoxide (HCH) or ditertiary-butyl peroxide, and the peroxides are added in a proportion of 1–10%, and advantageously 2–4%.

The following examples illustrate the invention, the parts and percentages being by weight, and A.N. denoting the acid number and O.H.N. denoting the hydroxyl number.

The methylol-aminotriazine allyl ethers used in the examples for reaction with the $\alpha:\beta$-unsaturated compounds can be prepared by known methods, for example, as follows:

*Allyl ether I.*—648 parts of hexamethylol-melamine are stirred well at 25° C. for one hour in a flask having stirring means with 2580 parts of allyl alcohol with the addition of about 237 parts of hydrochloric acid of about 36% strength. The mixture is then neutralized to Brilliant Yellow orange-red with calcined sodium carbonate (about 235 parts), and then the salt formed is filtered off and washed with allyl alcohol. From the clear filtrate there is then distilled under about 400 mm. pressure of mercury a mixture of allyl alcohol and water. Finally, the whole is completely dehydrated by heating it in an oil bath at an internal temperature of about 105° C. under reduced pressure. After being allowed to stand for several hours, the turbid syrup is filtered in the cold. There are obtained 883 parts of a water-clear syrup, which consists almost wholly of an allyl ether which contains about 5 allyl ether groups per molecule of melamine.

*Allyl ether II.*—645 parts of allyl alcohol are added to 153.5 parts of tetramethylol-benzoguanamine, and the mixture is reacted in a flask fitted with stirring means with the addition of 59.9 parts of concentrated hydrochloric acid for one hour at 20° C. 68 parts of calcined sodium carbonate are then added to neutralize the mixture to Brilliant Yellow orange-red, then the salt formed is filtered off and washed with allyl alcohol. From the clear filtrate the volatile constituents, such as water or allyl alcohol, are distilled off at an internal temperature of 105° C. under reduced pressure. After being allowed to stand for several hours, the turbid syrup so obtained is filtered in the cold. There are obtained 188 parts of a colorless syrup, which contains about 2.8 to 3.0 allyl ether groups per molecule of benzoguanamine.

*Allyl ether III.*—120 parts of paraformaldehyde are dissolved with the aid of heat in 1200 parts of allyl alcohol, and 126 parts of melamine are added to the solution. The mixture is then heated to the boil and maintained at the boil for about 4 hours, and then evaporated under reduced pressure until it becomes odorless. In this manner there is obtained a resin which contains about two allyl ether groups per molecule of melamine and is soluble in organic solvents and thickly viscous at room temperature.

The compositions obtained as described in the examples are tested by spreading a portion of the composition by means of a doctor roller on a glass plate sufficiently uniformly to yield a film having a mean thickness of 50–100$\mu$, and determining the Sward hardness of the film after certain intervals. A further portion of the composition is allowed to stand in a test tube to determine the gelationization time.

The compositions of the examples are hardened at a room temperature of about 20° C. and at a relative humidity of 65%.

*Example 1*

20 grams of the reaction product described below are catalyzed by the addition of 1 gram of a paste consisting of 60% of benzoyl peroxide and 40% of cyclohexanone, and also with 0.1% of cobalt in the form of its octoate dissolved in styrene.

By spreading the composition so obtained on a glass plate there is obtained a coating, which becomes dust-dry in about 85 minutes and after one day has a Sward hardness of 30, after 4 days a Sward hardness of 38 and after 8 days a Sward hardness of 50. The composition gelatinizes after 15 minutes.

The reaction product used in this example is prepared as follows:

A mixture of 98 parts (1 mol) of maleic anhydride, 148 parts (1 mol) of phthalic anhydride, 146 parts (2.36 mols) of glycol and 25 parts (0.43 mol) of benzyl alcohol is heated, while stirring and introducing carbon dioxide, for 6–7 hours at about 200° C., whereby a pale yellow moderately viscous polyester mixture having an A.N. of 27 is obtained. 100 parts of the resulting polyester mixture is then heated with 208 parts of allyl ether I in a boiling water bath, while stirring well. When the internal temperature of the reaction vessel has reached 70° C. it is subjected to the action of reduced pressure created by a water jet pump for 4½ hours so that volatile constituents, such as water and allyl alcohol, are distilled off. After about 2 hours the internal temperature is about 90° C. In this manner 291 parts of a reaction product having an A.N. of 5.0 and an O.H.N. of 45 are obtained.

*Example 2*

In a manner analogous to that described in Example 1 20 grams of the reaction product described below are catalyzed with benzoyl peroxide and cobalt.

When the composition so obtained is spread on a glass plate there is obtained a coating, which is dust-dry after 5½ hours and after 18 hours has a Sward hardness of 28, after 2 days a Sward hardness of 39 and after 5 days a Sward hardness of 43. The composition gelatinizes in 70 minutes.

The reaction product used in this example is obtained as follows:

1 mol of maleic anhydride is heated with 1 mol of glycol, while stirring, for 40 minutes at about 200° C. while continuously distilling off the water formed in the reaction, the heating being continued until there is obtained an ester mixture having an A.N. of 165. 25 parts of the ester mixture is then reacted with 208 parts of allyl ether I for 2 hours under the conditions given in Example 1, whereby a reaction product having an A.N. of 9 is obtained.

*Example 3*

(*a*) 20 grams of the reaction product described below are catalyzed as described in Example 1 with benzoyl peroxide and cobalt.

The composition so obtained is spread on a glass plate and yields a coating, which is dust-dry after 1¾ hours and has a Sward hardness of 24 after 18 hours, a Sward hardness of 38 after 2 days and a Sward hardness of 43 after 5 days. The composition gelatinizes in 50 minutes.

The reaction product used in this example is prepared as follows:

1 mol of maleic anhydride and 1 mol of glycol are heated for one hour at 96° C. under reflux, while stirring, and there is obtained an ester mixture having an A.N. of 325 and an O.H.N. of 118. 25 parts of the ester mixture are then reacted with 208 parts of allyl ether I for one hour under conditions that are otherwise identical with those used in Example 1, whereby a reaction product having an A.N. of 15 and an O.H.N. of 112 is obtained.

(b) By mixing 1 part of the reaction product described above with 1 part of distilled styrene and catalyzing the mixture with 2% of benzoyl peroxide and 0.1% of cobalt in the form of its octoate dissolved in styrene, there is obtained a composition which, when coated on glass plates, is dust-dry after 2¼ hours and has a Sward hardness of 30 after 18 hours, a Sward hardness of 38 after 2 days and a Sward hardness of 40 after 5 days. The composition gelatinizes in 8½ hours.

*Example 4*

(a) In the manner described in Example 1, 20 grams of the reaction product described below are catalyzed with benzoyl peroxide and cobalt.

The composition so obtained yields on glass plates coatings which are dust-dry after 6¼ hours, and have a Sward hardness of 19 after 18 hours, of 28 after 2 days and of 36 after 5 days.

The reaction product used in this example is prepared as follows:

1 mol of glycerine is heated with 3 mols of maleic anhydride for one hour at 96° C. under reflux, while stirring, whereby an ester mixture having an A.N. of 366 and an O.H.N. of 66 is obtained. 25 parts of the ester mixture are then reacted with 208 parts of allyl ether I for one hour under conditions otherwise the same as those used in Example 1, whereby a reaction product having an A.N. of 28 and an O.H.N. of 40 is obtained.

(b) By mixing 1 part of the aforesaid reaction product with 1 part of a distilled styrene, and catalyzing the mixture in the manner described in Example 3(b), there is obtained a composition which yields on glass plates, coatings which are dust-dry after 2¾ hours, and have a Sward hardness of 21 after 18 hours, of 37 after 2 days and of 38 after 5 days. The composition gelatinizes after 6½ hours.

*Example 5*

20 parts of the reaction product described below are mixed with 1 part of acrylic acid (stabilized with 0.05% of hydroquinone) diluted with 10.7 parts of styrene, and catalyzed with 0.80 part of tertiary butyl hydroperoxide of 75% strength, and 0.45 part of cobalt octoate.

By spreading the resulting composition on a glass plate a coating is produced which is dust-dry after 2 hours and 55 minutes, and has a Sward hardness of 20.2 after 1 day, of 23.2 after 3 days and of 28.6 after 8 days. The composition gelatinizes after 1 hour and 23 minutes and solidifies to a hard block overnight.

The reaction product used in this example is prepared as follows:

A mixture of 98 parts (1 mol) of maleic anhydride, 146 parts (1 mol) of adipic acid and 130.2 parts (2.1 mols) of glycol is heated, while stirring and introducing nitrogen, for 4–5 hours at about 210–225° C., whereby a pale yellow polyester mixture of medium viscosity having an A.N. between 40 and 50 and an O.H.N. between 25 and 35 is obtained.

200 parts of the polyester mixture are then heated to about 80° C., while stirring well, with 100 parts of allyl ether II, and the mixture is subjected to the pressure of a water jet pump of about 735 mm. of mercury for 2½ hours, so that volatile products such as water and allyl alcohol distill off. In this manner there are obtained 275 parts of a reaction product having an A.N. of 12.5 and an O.H.N of 7.5.

*Example 6*

A spreading, cement or modelling composition is prepared from components A and B described below.

Component A is prepared as follows: 200 parts of the polyester mixture described in Example 5 are reacted with 100 parts of melamine allyl ether I for about 1½ to 2 hours at 75–80° C. under a pressure of about 735 mm. of mercury, while stirring well, the volatile constituents, such as water and allyl alcohol, being distilled off so that the reaction product has an A.N. of 28. There are then added at about 75° C. 14.6 parts of monomeric acrylic acid, which has been stabilized with 0.05% of hydroquinone, and the temperature is allowed to fall in the course of 45 minutes to 40° C. The mixture is then diluted with 82.75 parts of monomeric styrene, which has been stabilized with 0.04% of tertiary butyl-catechol, and then the whole is filtered. After cooling the mixture to room temperature it is catalyzed with 0.1% of cobalt in the form of a solution of cobalt octoate of 5% strength by volume of styrene.

Component B has the following composition:

20 parts of lithopone
40 parts of titanium dioxide (rutile)
30 parts of slate powder
10 parts micaceous iron ore
0.4 part of hydroxy-cyclohexyl hydroperoxide (HCH)

By mixing 1 part of component A with 2.5 parts of component B a spreadable mass is obtained which hardens in the course of 10–15 minutes, and after 30 minutes is dust-dry and after one hour can be ground well without smearing. In order to prepare a kneadable cement-like mass 1 part of component A is mixed with 3.2 parts of component B. The composition so obtained can be kneaded and shaped very well, without sticking or smearing, and gelatinizes in 15 minutes and completely hardens throughout in about 1½ hours.

*Example 7*

2.04 parts of allyl ether III are reacted with 2.04 parts of the unsaturated polyester described in Example 5 at 90° C. under the reduced pressure of a water jet pump to distil off the volatile constituents, and the reaction is continued until a highly viscous reaction product is obtained. This product is dissolved in 1.82 parts of styrene and catalyzed with 0.1% of cobalt in the form of its octoate and with 3% of tertiary butyl hydroperoxide. Films of the resulting composition on glass plates are dust-dry in 25 minutes. The composition gelatinizes in a test tube in the course of 7–8 minutes and very thick layers thereof harden throughout in 12 hours.

*Example 8*

3.33 parts of the glycerine acrylic acid ester described below are reacted with 6.66 parts of allyl ether I for 1½ hours at 90° C. under the reduced pressure of a water jet jump while distilling off the volatile constituents.

1 part of the reaction product so obtained is dissolved in 1 part of styrene and catalyzed as described in Example 7. Even thick films of the composition applied to glass plates harden in 3 hours.

The glycerine acrylic acid ester mentioned above is obtained by heating 1 mol of glycide with 1 mol of acrylic acid at 120° C. with the addition of a known polymerization inhibitor such as hydroquinone or copper carbonate. The reaction product has an A.N. of 181 and an O.H.N. of 347.5.

What we claim is:

1. A composition of matter which is hardenable throughout at room temperature at the surface and in the interior which comprises (1) a metal drier, (2) an organic peroxide, and (3) a non-gelatinized condensation product obtained by condensing (A) a formaldehyde condensation product of an aminotriazine containing 2–3 NH$_2$-groups and in which formaldehyde condensation product 2–6 N-methylol groups are etherified with allyl acohol, with (B) an unsaturated ester from an α:β-unsaturated aliphatic carboxylic acid and an aliphatic polyhydric alcohol, which ester contains at least two free condensable groups selected from the class consisting of carboxylic group and hydroxyl group.

2. A composition of matter which is hardenable throughout at room temperature at the surface and in the interior which comprises (1) a cobalt drier, (2) an organic peroxide, and (3) a non-gelatinized condensation product obtained by condensing (A) a formaldehyde condensation product of an aminotriazine containing 2–3 NH$_2$-groups and in which formaldehyde condensation product 2–6 N-methylol groups are etherified with allyl alcohol, with (B) an unsaturated ester from an α:β-unsaturated aliphatic carboxylic acid and an aliphatic polyhydric alcohol, which ester contains at least two free condensable groups selected from the class consisting of carboxylic group and hydroxyl group.

3. A composition of matter which is hardenable throughout at room temperature at the surface and in the interior which comprises (1) a metal drier, (2) an organic peroxide, and (3) a non-gelatinized condensation product obtained by condensing (A) a methylol melamine in which 2–6 N-methylol groups are etherified with allyl alcohol, with (B) an unsaturated ester from an α:β-unsaturated aliphatic carboxylic acid and an aliphatic polyhydric alcohol, which ester contains at least two free condensable groups selected from the class consisting of carboxylic group and hydroxyl group.

4. A composition of matter which is hardenable throughout at room temperature at the surface and in the interior which comprises (1) a cobalt drier, (2) an organic peroxide, and (3) a non-gelatinized condensation product obtained by condensing (A) a methylol melamine in which 4–6 N-methylol groups are etherified with allyl alcohol, with (B) an unsaturated ester from an α:β-unsaturated aliphatic carboxylic acid and an aliphatic polyhydric alcohol, which ester contains at least two free condensable groups selected from the class consisting of carboxylic group and hydroxyl group.

5. A composition of matter which is hardenable throughout at room temperature at the surface and in the interior which comprises (1) a metal drier, (2) an organic peroxide, and (3) a non-gelatinized condensation product obtained by condensing (A) a methylol-benzoguanamine in which 2–4 N-methylol groups are etherified with allyl alcohol, with (B) an unsaturated ester from an α:β-unsaturated aliphatic carboxylic acid and an aliphatic polyhydric alcohol, which ester contains at least two free condensable groups selected from the class consisting of carboxylic group and hydroxyl group.

6. A composition of matter which is hardenable throughout at room temperature at the surface and in the interior which comprises (1) a cobalt drier, (2) an organic peroxide, and (3) a non-gelatinized condensation product obtained by condensing (A) a methylol-benzoguanamine in which 2–3 N-methylol groups are etherified with allyl alcohol, with (B) an unsaturated ester from an α:β-unsaturated aliphatic carboxylic acid and an aliphatic polyhydric alcohol, which ester contains at least two free condensable groups selected from the class consisting of carboxylic group and hydroxyl group.

7. A composition of matter which is hardenable throughout at room temperature at the surface and in the interior which comprises (1) a metal drier, (2) an organic peroxide, and (3) a non-gelatinized condensation product obtained by condensing (A) a formaldehyde condensation product of an aminotriazine containing 2–3 NH$_2$-groups and in which formaldehyde condensation product 2–6 N-methylol groups are etherified with allyl alcohol, with (B) an unsaturated polyester from α:β-unsaturated aliphatic dicarboxylic acid and an aliphatic polyhydric alcohol, which ester contains at least two free condensable groups selected from the class consisting of carboxylic group and hydroxyl group.

8. A composition of matter which is hardenable throughout at room temperature at the surface and in the interior which comprises (1) a metal drier, (2) an organic peroxide, and (3) a non-gelatinized condensation product obtained by condensing (A) a formaldehyde condensation product of an aminotriazine containing 2–3 NH$_2$-groups and in which formaldehyde condensation product 2–6 N-methylol groups are etherified with allyl alcohol, with (B) an unsaturated ester from an α:β-unsaturated aliphatic monocarboxylic acid and an aliphatic polyhydric alcohol, which ester contains at least two free condensable groups selected from the class consisting of carboxylic group and hydroxyl group.

9. A composition of matter as claimed in claim 1 which composition also contains styrene.

10. A composition of matter as claimed in claim 1 which composition also contains acrylic acid.

References Cited in the file of this patent
UNITED STATES PATENTS 2,829,119    Dudley et al.    Apr. 1, 1958

FOREIGN PATENTS 538,993    Great Britain    Aug. 25, 1941

OTHER REFERENCES

Ellis: Chemistry of Synthetic Resins, volume 1, Reinhold Publishing Corporation (1935), pages 784 and 785 relied upon.